Figure 1:
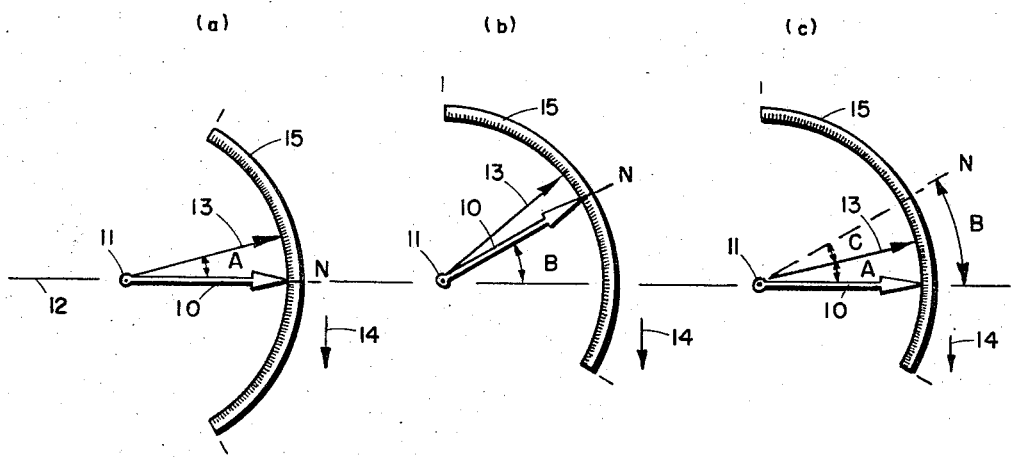

Feb. 13, 1968     C. U. BOUTIN     3,368,777

INTERNALLY STABILIZED INERTIAL INSTRUMENT

Filed April 21, 1958     2 Sheets-Sheet 1

INVENTOR.
CHARLES U. BOUTIN

BY *Allan Rothenberg*

ATTORNEY

INVENTOR.
CHARLES U. BOUTIN

United States Patent Office 3,368,777
Patented Feb. 13, 1968

3,368,777
INTERNALLY STABLIZED INERTIAL
INSTRUMENT
Charles U. Boutin, Tucson, Ariz., assignor to North American Rockwell Corporation, a corporation of Delaware
Filed Apr. 21, 1958, Ser. No. 730,753
12 Claims. (Cl. 244—3.2)

This invention relates to the stabilization of inertial instruments and particularly concerns an acceleration sensitive device which is internally referenced to a selected spatial direction.

Accelerometers are inertial instruments which produce signals proportional to acceleration, velocity or distance as measured in the direction of the sensitive axis of the instrument. The signal produced by the accelerometer may be directly proportional to sensed acceleration, or when integrated either internally or externally once or twice, will be proportional to velocity and distance respectively. The operation of such an accelerometer whether it provides an output indicating acceleration, velocity or distance, embodies the inertial displacement of a pendulous mass from a reference or null position which is determined by the support or case to which the mass is mounted. The orientation of such support or case, therefore, determines the direction of the axis of sensitivity of the instrument. The function of an accelerometer is primarily the measurement of acceleration, or the first or second integral thereof, along a known or predetermined direction. Thus, the accelerometer output must be free of any inertial forces contributed by accelerations along directions other than that which is selected. It follows that the accelerometer must somehow be arranged to be free of any unknown angular deviation or perturbation from its selected orientation.

Space stabilization or isolation of the accelerometer from angular perturbations of the vehicle in which it is carried is commonly achieved by the use of a delicate, complex and bulky gimbal system which mounts the instrument to its carrying vehicle in such a manner that the accelerometer itself will be fixedly orientated in space regardless of the rotational motion or unpredictable angular perturbation of the vehicle. Such a gimbal system, commonly known as a stable platform, stabilizes the accelerometer as an entity by physically isolating the entire instrument from the vehicle motion. The gimbal system prevents transmission to the accelerometer of the angular motion of the vehicle.

Direct vehicle mounting of inertial instruments has been suggested for those applications where requirements of accuracy are such that errors due to perturbation or angular deviation may be tolerated in order to effect the prime objective of simplicity, reliability and overall ease of handling. Such efforts, however, have been achieved at the cost of a substantial deterioration of accuracy by virtue of the perturbations to which the accelerometer is subjected.

Accordingly, it is an object of this invention to provide the advantages of direct vehicle mounting of an accelerometer without compromise of the accuracy inherent in a gimbal mounted instrument. In accordance with the disclosed embodiment of the invention, the null or reference position of the pendulous mass as related to the accelerometer support or case is shifted about the pivot axis in accordance with the angular perturbation of the accelerometer carrying vehicle about such axis as detected by an angular inertial reference instrument. More particularly, the accelerometer comprises a support and a pendulous mass angularly shiftable relative to the support in response to acceleration. A pickoff is provided for detecting angular deviation of the mass from a reference direction fixedly related to the support. A gyroscope is provided for detecting angular deviation of the support about the pivot axis and provides an output which is utilized after being algebraically combined with the pickoff signal for substantially maintaining at zero the angular deviation of the mass from a reference direction bearing a predetermined relation to inertial space. Functionally stated, the accelerometer pendulous mass is servoed to align itself with the gyroscope defined orientation while the accelerometer support is allowed to partake of perturbations of the vehicle.

It is an object of this invention to provide an internal space fixed reference in an accelerometer.

Another object is to effect internal stabilization of an accelerometer having an unpredictable spatial attitude.

A further object is the provision of an improved guidance system.

A still further object of the invention is to provide an accelerometer which may be subjected to angular displacement but which, nevertheless, has an output independent of such displacement.

Figure 2:
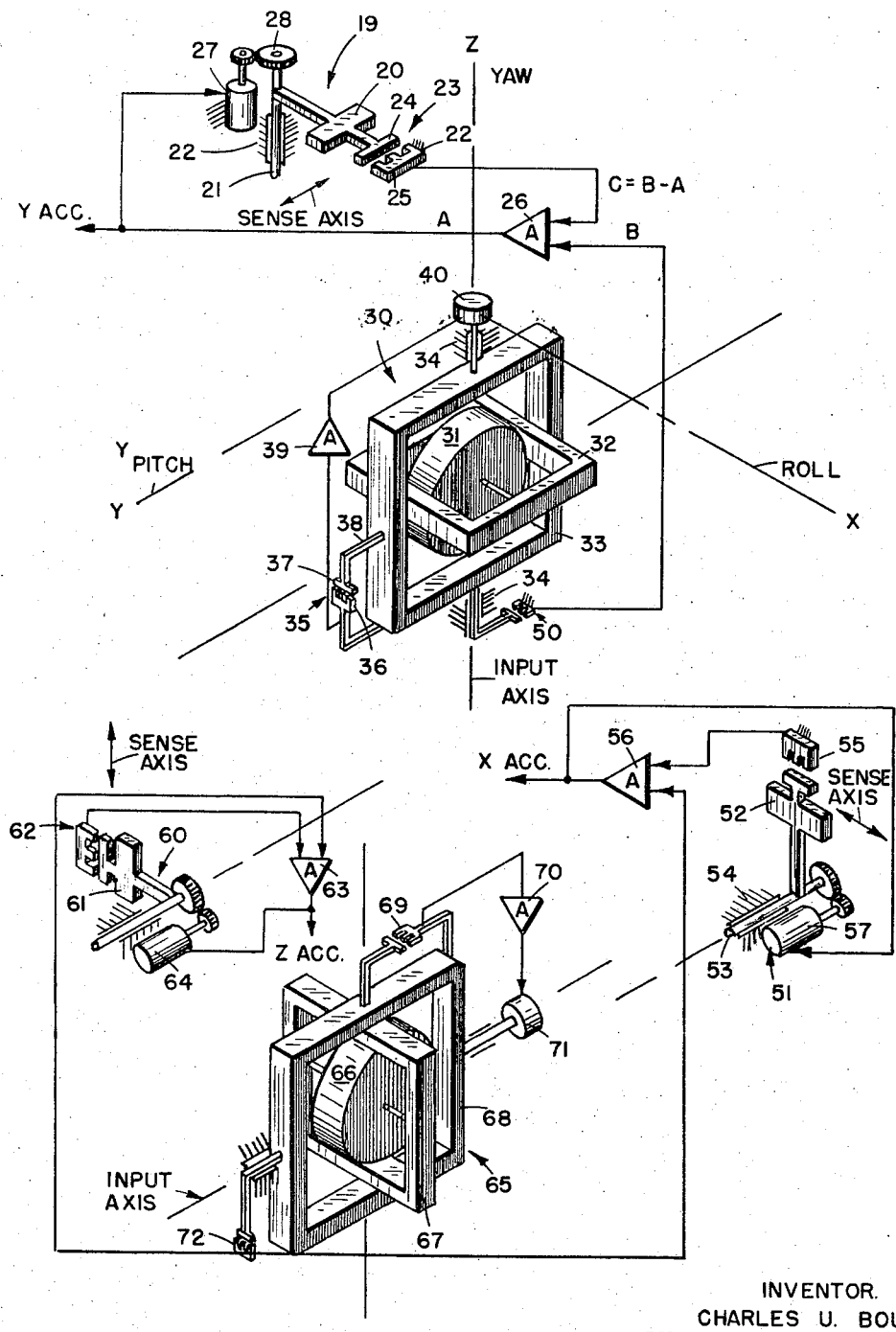

These and other objects of this invention will become apparent from the following description taken in connection with the accompanying drawings, in which:

FIG. 1 graphically depicts operation of the internal stabilization of the accelerometer; and FIG. 2 illustrates a guidance system having three mutually orthogonal vehicle fixed accelerometers.

In the drawings like numerals refer to like parts.

As illustrated in FIG. 1, an accelerometer without a force balance feedback loop may be graphically represented by a pendulous mass 10 pivoted about an axis 11 normal to the plane of the drawing and movable from a space fixed direction 12 to a position indicated at 13 in response to acceleration of the pendulous mass support along a direction indicated by the arrow 14. The arrow 14 indicates the sensitive axis of the accelerometer or, more particularly, the spaced fixed direction in which the sensitive axis of the accelerometer is to be maintained.

The circular arc 15 indicates the accelerometer pickoff and may be depicted as a scale which is fixed to the support to which the pendulous mass 10 is pivoted. FIG. 1(a) illustrates the relative positions of the mass and scale 15 in the absence of any angular deviation of the accelerometer support from its desired or preselected orientation. With no perturbation and no acceleration the pendulous mass will be in the position indicated at 10 with the pointer of mass 10 directly adjacent the null or reference position N of the scale 15. With the accelerometer subjected to some acceleration in the direction of the arrow 14 the mass 10 will be inertially deflected to the position indicated at 13 whereby the angle A between 10 and 13 will be indicative of the sensed acceleration.

FIG. 1(b) illustrates the operation of the accelerometer when its support is displaced about the pivot axis by an angle B. With zero acceleration the mass 10 is still at the null position N of the scale 15 which has been shifted relative to the space fixed direction 12 by the angle B due to the perturbation. In such a situation if an acceleration 14 be applied to the accelerometer along the desired space fixed axis of the instrument, such an acceleration will have a component extending along the line of the arrow 10 which component will not appear as any inertial displacement of the mass. The mass 10 under such an acceleration will be inertially displaced to the position indicated at 13 by an angle which is now less than the magnitude of the acceleration actually applied in the direction 14. In other words, the sensitive axis of the accelerometer due to the perturbation B has been displaced by an amount equal to such perturbation and the output of the accelerometer, in this instance the angular displacement of the mass 10, is in error by virtue of such perturbation. The output of the accelerometer, it will be noted, is desirably proportional at all times to acceleration along the space fixed direction 14.

Graphically illustrated in FIG. 1(c) is the accelerometer perturbed as in FIG. 1(b) but with the internal stabilization provided in accordance with the principles of this invention. The support or scale 15 is still perturbed or angularly displaced from the spatial reference direction 12 by the angle B, but in this instance the magnitude of such perturbation has been measured and the mass 10 has been angularly shifted about its pivot axis through an angle equal and opposite to the angle B. Thus, the direction of pendulosity is maintained normal to the desired space fixed axis of sensitivity 14. Now, if the accelerometer should be subjected to an acceleration along its sensitive axis 14, the pendulous mass will be inertially shifted in response to the entire amount of acceleration applied along the sensitive axis. In this instance the output of the accelerometer (angular deviation from the null N) is proportional to the angle C which, when algebraically combined or subtracted from the perturbation angle B, will yield the desired acceleration proportional to the angle A, the angle between 10 and 13.

As illustrated in FIG. 2, a typical pendulous mass accelerometer may comprise a mass 20 fixed to a pivot shaft 21 which is journalled about an axis coincident with or parallel to the Z axis, indicated, in a support 22 which will preferably comprise the outer case of the accelerometer which is fixedly secured to the vehicle in which the instrument is to be fixedly mounted. The accelerometer includes a conventional E pickoff 23 comprising an arm 24 of magnetic material secured to the mass 20 and a three-legged core 25 fixed to the accelerometer case or fixed support 22. Coils and a source of energy therefor (not shown) are provided on the legs of core 25 as is well-known. The pickoff 23 thus will provide a signal which indicates both the magnitude and direction of the angular displacement of the mass 20 relative to the support 22. The pickoff signal is fed through a mixer or summing amplifier 26 which feeds to a torque motor 27 a signal having a magnitude and polarity in accordance with the magnitude and polarity of the input to the amplifier 26. A demodulator will be included in the feedback loop when the pickoffs provide A-C signals and a D-C torque motor is employed. The torque motor 27 via gearing 28 exerts upon the pendulous mass 20 a torque of such magnitude and polarity as to substantially balance inertial pendulous torques applied to the mass 20 by virtue of accelerations directed along the sensitive axis of the instrument. Thus, a force balance system is provided which substantially maintains the mass and its pickoff at a null position. In the absence of acceleration, the pickoff output is zero and the torquer supplies no torque to the mass. When the instrument is subjected to acceleration the mass 20 tends to pivot about its pivot axis producing a signal from the pickoff which is fed through the amplifier 26 to the torque motor 27 which torques the shaft 21 to substantially null the angular deviation detected by the pickoff 23. It is to be understood that the accelerometer illustrated is typical of several different accelerometers of a type well-known to those skilled in the art and other functionally similar accelerometers may be utilized in the practice of this invention. Typical pendulous force balance or integrating accelerometers are illustrated in an application S.N. 615,629 of D. E. Wilcox for Induction Velocity Meter, filed Oct. 12, 1956, now Patent No. 2,964,949, and an application S.N. 536,686 of J. M. Wuerth et al. for Improved Accelerometer and Integrator, filed Sept. 23, 1955, now Patent No. 3,122,022.

In the arrangement illustrated in FIG. 2 the accelerometer 19 may be fixed to a vehicle such as a ballistic missile or airframe having roll, pitch and yaw axes respectively designated as X, Y and Z. The accelerometer 19 is arranged to detect lateral accelerations of the vehicle or support 22 directed along the axis Y. It is to be noted, however, that the roll, pitch and yaw axes of the vehicle will not necessarily correspond at all times to the space fixed axes X, Y and Z. The correspondence or coincidence of the vehicle axes with the space fixed axes as indicated in the figure will exist, for example, solely when all angular perturbations of the vehicle measured about the space fixed axes X, Y and Z are zero. Thus, it is the purpose and function of the accelerometer 19 to measure vehicle accelerations along the space fixed axis Y. The vehicle will be provided with one of several well-known autopilot and attitude control systems which will tend to maintain the roll, pitch and yaw axes thereof substantially in alignment with the space fixed axes. However, due to various aerodynamic factors and lag in the response of the autopilot attitude control system in any vehicle, the actual vehicle attitude will generally depart to some extent from the desired attitude. Such angular departure from the space fixed X, Y and Z axes are the angular perturbations which will introduce errors in the vehicle fixed accelerometer by angularly shifting the sensitive axis thereof from its desired space fixed orientation. In accordance with the present invention the perturbations of the vehicle (and thus of the accelerometer 19 fixed thereto) about the Z axis, which extends in the same direction as the pivot axis of the accelerometer mass, are detected by a gyroscope 30 and applied internally to the accelerometer 19.

The vehicle fixed gyroscope 30 is arranged to provide an output signal which is a measure of the angular displacement or perturbation of the vehicle about the Z axis. The gyroscope output is utilized to angularly shift the mass 20 about its pivot axis in an amount and direction such that the sensitive axis of the accelerometer 19 will remain aligned with the space fixed Y axis. While the invention may be mechanized with a rate integrating gyroscope, there is illustrated for purposes of exposition a typical single axis gyroscope, which is but one of many well-known instruments for providing a signal proportional to angular displacement from a space fixed orientation. The gyroscope is illustrated as comprising a rotor 31 rotated in inner-gimbal 32 about the X axis. The inner-gimbal 32 is pivotally mounted about the Y axis in an outer-gimbal 33 which is pivoted about the Z axis to a support 34 which may be the vehicle itself or some frame, plate or base member rigidly affixed thereto and to the support of the accelerometer. The gyroscope maintains a space fixed reference orientation about the Z axis which is the input axis of the gyroscope. Any torque applied to the gyroscope about the input axis is manifested as an output axis precession or angular displacement about the Y axis. The E pickoff 35 has a three-legged core 36 fixed to outer-gimbal 33 and the armature 37 thereof fixed to a shaft 38 which is fixed to inner-gimbal 32 and may provide the pivotal mounting of such gimbal. Thus, upon output axis precession in response to any disturbing input axis torque, the pickoff 35 will feed a signal through amplifier demodulator 39 to drive a torque motor 40 which is fixed to the support 34 and connected to torque the outer-gimbal 33 about the input axis in a sense to null any disturbing input axis torque. In this manner the input axis of the gyroscope is maintained in its space fixed reference orientation. The gyroscope is provided with an output pickoff 50 which may be identical to the pickoffs 23 and 35 and has the relatively movable parts thereof fixed to the support member 34 and the outer-gimbal 33 respectively. Thus, upon perturbation of the vehicle and support 34 about the Z axis, the spatial reference defined by the gyroscope, the pickoff 50 will provide an output signal proportional in magnitude and sense to the magnitude and sense of such perturbation. This signal from pickoff 50 is fed as a second input to the summing amplifier 26 and provides a component of the amplifier output which is proportional to the angular deviation of the sensitive axis of the accelerometer about the space fixed Z axis.

Assuming zero perturbation about the Z axis and no lateral acceleration along the Y axis, both inputs to the summing amplifier 26 are at zero, no torques are exerted on the mass 20 and the pickoff 23 is aligned at an initial or zero perturbation null position. Still assuming no Y axis acceleration but with the Z axis perturbation indicated by a signal from gyroscope pickoff 50 having a magnitude and sense proportional to the magnitude and sense of the perturbation B, the amplifier 26 will feed a signal to the accelerometer torquer 27 of a magnitude and sense such that the mass 20 and the arm 24 of pickoff 23 are displaced to a new or perturbed null position. The pickoff 23 in such a situation, still assuming no acceleration, will provide a signal indicative of the magnitude and sense of the displacement of the mass 20 which in this instance will be equal and opposite to the signal provided by the gyroscope pickoff 50. Therefore, when the torquer 27 has displaced the mass 20, and thus the sensitive axis of the accelerometer, by an angle equal to the measured Z axis perturbation B, the two inputs to the summing amplifier 26 are equal and opposite and no further output from the amplifier 26 exists whereby the mass 20 will remain at such perturbed null position and the sensitive axis of the accelerometer is and remains properly oriented as desired along the Y axis.

With the null position of the accelerometer 19 angularly shifted by an amount equal to the detected perturbation B, any acceleration to which the vehicle and accelerometer support are subjected along the Y axis will now relatively displace the elements of pickoff 23 from the perturbed null position to thereby change the output of the pickoff 23 by an increment A having a magnitude and sense in accordance with the magnitude and sense of the applied acceleration. Utilizing the symbols of FIG. 1(c), the pickoff 23 now has an output indicative of the angle C which is equal to the difference between the displacement of the mass 20 due to the perturbation B and the displacement of the mass 20 due to the acceleration A. Thus, the input from pickoff 23 to the summing amplifier 26 is equal to B minus A and the input from pickoff 50 of the gyroscope is equal to B. The two inputs are algebraically combined in the summing amplifier to provide an output having a magnitude and sense in accordance with magnitude and sense of the acceleration A. It will be understood, according to conventional practice, that the relative polarities of the signal components B which are received by the summing amplifier 26 from pickoffs 23 and 50, respectively, are chosen so that the two components will mutually cancel in a summing amplifier. The force balance loop, including the amplifier output and the torquer, now operates to torque the mass 20 with a torque substantially equal and opposite to the inertial or acceleration induced torque A and the pickoff 23 thus will remain substantially at its perturbed null position with the sensitive axis aligned with the space fixed Y axis. The amplifier output comprises the desired output of the accelerometer which is thus always proportional to the acceleration along the Y axis despite the fact that the accelerometer support may be angularly shifted or perturbed. Thus, in accordance with the invention, space stabilization of the sensitive axis of the accelerometer is maintained not by stabilizing the entire accelerometer but simply by maintaining the shiftable mass thereof in a predetermined spatial orientation as defined by the gyroscope 30.

It will be seen that the component of accelerometer error which is corrected by the shift of the null position is but one of several errors to which the accelerometer may be subjected. However, other errors such as crosscoupling effects, gravity, Coriolis and centrifugal accelerations may be either neglected, eliminated or diminished by additional circuitry or structure or by providing a closely controlled predetermined flight path of the vehicle. For example, the sensitive axis of the accelerometer 19 will also depart from its desired space fixed orientation along the Y axis due to perturbation of the vehicle about the X axis. The invention may be used in a vehicle having an autopilot which closely controls the roll attitude (about the X axis) of the vehicle. With such a close roll control a considerable yaw deviation and lateral velocity may be tolerated by utilizing the described lateral accelerometer 19 to provide lateral acceleration, velocity and displacement information. Alternatively, errors due to roll perturbation may be independently computed and combined electrically or otherwise with the accelerometer output. If errors due to gravitational components, Coriolis and centrifugal acceleration are deemed to be intolerable in any particular application, these may be pre-computed and programmed as a function of time where the flight path itself is programmed and closely controlled. Such programmed gravity, Coriolis and centrifugal acceleration corrections may then be electrically or otherwise combined with the acceleration signal provided by accelerometer 19 if greater precision is required. Of course, errors due to centrifugal accelerations may be eliminated by programmed travel in a straight line. While the invention itself may not compensate for all possible errors to which the accelerometer may be subjected, a substantial portion of such errors are eliminated by a simple arrangement which requires nothing more than a modification of the already existing amplifier and the force balance loop. This is so by reason of the fact that the gyroscope 30 may itself be one of the existing sensing elements of the autopilot itself and thus an additional gyroscope may not be necessary.

Illustrated in FIG. 2 is the adaptation of the principles of this invention to provide, for all three coordinate axes, X, Y and Z, an acceleration signal which is compensated for a major portion of the error therein due to angular perturbation about a selected axis. For providing a stabilized acceleration signal indicative of acceleration along the X axis, there is provided the accelerometer 51 which may be identical except for orientation to accelerometer 19. Accelerometer 51 will comprise a mass 52 pivoted about the pitch axis by a shaft 53 in a support 54 which may be the vehicle itself or the accelerometer case which is rigidly affixed to the vehicle. A pickoff 55 has an output which provides one input to summing amplifier 56 to effect torquing of the mass 52 my means of torque motor 57 in accordance with the mixer output. Similarly, an accelerometer 60 is provided to produce compensated or stabilized acceleration signals indicative of the vehicle acceleration along the space fixed Z axis. This accelerometer is identical except for orientation with the two accelerometers 19 and 51 and, furthermore, has its pivot axis extending in the same direction, along the pitch axis, as the pivot axis of the accelerometer 51. The accelerometer 60 comprises pendulous mass 61, E pickoff 62, summing amplifier 63 and torque motor 64 all similar to and connected and arranged in a manner such as described in connection with the corresponding elements of accelerometer 19. While the pivot axes of accelerometers 51 and 60 extend in the same direction, it is noted that the sensitive axes thereof are mutually orthogonal, an arrangement which is effected simply by providing for 90 degree difference in orientation between the two masses as defined by the initial or unperturbed null positions of the pickoffs 55 and 62, respectively. Thus, the accelerometers 51 and 60 may each be internally stabilized in accordance with the concept of the invention by detecting angular perturbation of the vehicle or accelerometer support about the pitch axis, the axis parallel to the pivot axes of both accelerometers.

For the purpose of defining a space fixed Y axis reference, there is provided the gyroscope 65 which may be identical except for orientation to the Z axis gyroscope 30. The Y axis gyroscope 65 comprises a rotor 66 mounted for rotation about the X axis in an inner-gimbal 67 which in turn is pivoted about the Z axis in outer-gimbal 68 itself pivoted about the Y axis to the vehicle or a frame, plate or base member rigidly affixed thereto. The gyroscope includes a precession pickoff 69 feeding through amplifier demodulator 70 to torque motor 71 to torque the gyroscope in a sense to null any input axis disturbing torque whereby the input axis of the gyroscope is maintained in its space fixed orientation along the Y axis. The gyroscope has an output pickoff 72 which provides a signal indicative of the magnitude and sense of angular deviation or perturbation of the vehicle about the Y axis. The output of pickoff 72, the pitch perturbation signal, is fed as a second input to amplifier 56 and also as a second input to amplifier 63. Thus, the X axis accelerometer 51 is internally stabilized from the gyroscope 65 by having its null position angularly shifted in proportion to the detected angular deviation in pitch of the accelerometer and the vehicle itself. Similarly, the Z axis accelerometer 60 is internally stabilized from the same pitch axis gyroscope 65 by having its mass 61 and thus its null position servoed or slaved to the orientation of the space fixed Y axis reference. It will be seen that with an adequate control of roll perturbation each of the three accelerometers 19, 51 and 60 will have their sensitive axes fixed in space completely independent of yaw or pitch perturbation of the vehicle or of the accelerometers fixed thereto.

There has been disclosed a vehicle fixed accelerometer requiring no complex gimbal mounting or external stabilization which has its sensitive axis stabilized against perturbations about one of the two mutually orthogonal axes which are normal to the accelerometer sensing axis. The internal stabilization is effected despite perturbations of the accelerometer case or support by slaving the pendulous mass of the accelerometer to the spaced fixed reference orientation as defined by the gyroscope.

Although this invention has been described and illustrated in detail, it is to be clearly understood that the same is by way of illustration and example only and is not to be taken by way of limitation, the spirit and scope of this invention being limited only by the terms of the appended claims.

I claim:

1. An accelerometer including a body, a mass angularly shiftable relative to said body in response to inertial forces applied thereto in the direction of a predetermined axis thereof and force balance means for maintaining said mass in a null position; gyroscopic means for generating a signal in response to angular deviation of said body about a reference axis bearing a predetermined relation to inertial space; and means responsive to said gyroscopic means for displacing said mass in accordance with said signal.

2. In combination with a body adapted to move with a random component of angular motion about an axis thereof, an accelerometer fixedly mounted to said body and having a mass pivotally mounted about said axis and having a sensitive axis normal to said body axis, a gyroscope on said body for generating a perturbation signal proportional to said random motion of said body about said first mentioned axis, and means responsive to said gyroscope for applying to said mass in the direction of said sensitive axis a force proportional to said signal.

3. In combination with a body adapted to move with a random component of angular motion about an axis bearing a predetermined relation to inertial space, an accelerometer fixedly mounted to said body and having a sensitive axis normal to said predetermined axis, a gyroscope on said body for generating a perturbation signal proportional to said random motion of said body about said predetermined axis, said accelerometer including a pivotally mounted mass, and means responsive to said gyroscope for displacing said mass about an axis extending in the same direction as said predetermined axis in proportion to said signal.

4. In combination wtih an accelerometer having a support and a pendulous mass pivoted thereto for motion about a predetermined axis of said support in response to inertial forces applied to said accelerometer in a direction normal to said axis, means for detecting angular deviation of said support about an axis extending in the same direction as said predetermined axis, and means responsive to said detecting means for shifting said mass about said predetermined axis in accordance with said detected deviation whereby the angular deviation of said mass relative to said support is maintained equal to said angular deviation of said support in the absence of said inertial forces.

5. An accelerometer having an angularly shiftable mass and a pickoff for detecting angular deviation of said mass from a reference direction having a predetermined relation to inertial space, a gyroscope for detecting angular deviation of said accelerometer, and means responsive to said gyroscope and said pickoff for shifting said mass to maintain said angular deviation substantially zero.

6. An accelerometer having a support, an angularly shiftable mass pivoted to said support about a pivot axis, and a pickoff for detecting angular deviation of said mass from said support; a gyroscope defining a reference extending in the direction of said axis; and means responsive to said gyroscope and said pickoff for angularly shifting said mass about said axis to reduce the angular deviation of said mass relative to said reference despite deviation of said support relative to said reference.

7. An accelerometer having a support and a mass angularly shiftable in a predetermined direction relative to said support from a spatially fixed reference orientation, and means responsive to angular motion of said support about an axis normal to said direction for shifting said mass relative to said support in a sense to maintain said mass in said reference orientation.

8. For use with an accelerometer having a support, a mass mounted to said support for motion about a pivot axis and a feedback loop for torquing said mass in accordance with motion of said mass about said pivot axis in a sense to decrease said motion, apparatus for spatially stabilizing said mass during angular deviation of said support from a predetermined spatial attitude about an axis extending in the direction of said pivot axis comprising gyroscopic means for detecting angular motion of said support about an axis extending in the direction of said pivot axis, and means responsive to said gyroscopic means for modifying the torquing of said mass by said feedback loop in accordance with said detected motion of said support.

9. For use in a vehicle movable with a combination of rotational and translational motion, a support adapted to be fixed to said vehicle to partake of said motion, a mass pivoted to said support about a selected pivot axis, a pickoff connected to said mass and support to detect motion of said mass about said axis relative to said support, a motor connected to torque said mass about said axis, a mixer having a first input coupled with said pickoff and a second input, said mixer having an output coupled to said motor, a gyroscope adapted to be fixed to said vehicle and having an input axis extending in the same direction as said selected axis whereby said gyroscope has an output indicative of angular motion of said vehicle and support about said selected axis, said gyroscope output being coupled with said second mixer input.

10. In combination with a vehicle to be guided, first, second and third accelerometers fixedly mounted to said vehicle and having mutually orthogonal sensing axes, said first accelerometer including a mass mounted for pivotal motion about a first axis fixedly related to said vehicle, said second and third accelerometers each including a mass mounted for pivotal motion about an axis fixedly related to said vehicle and extending in a direction normal to said first axis, a first gyroscope on said vehicle having an output proportional to angular motion of said vehicle about said first axis, means responsive to said gyroscope for shifting the mass of said first accelerometer about said first axis in accordance with vehicle motion about said first axis, a second gyroscope on said vehicle having an output proportional to angular motion of said vehicle about a second axis extending in said direction normal to said first axis, and means responsive to said second gyroscope for shifting the mass of each of said second and third accelerometers about its pivot axis in accordance with vehicle motion about said second axis.

11. In combination, an accelerometer having a sensitive axis and comprising a support adapted to be fixedly mounted to a vehicle, a mass pivoted to said support about a pivot axis normal to said sensitive axis, a pickoff mounted between said mass and support and having an output indicative of the angular relation therebetween, a gyroscope fixedly connected with said support and having an output indicative of the angular displacement of said support about an axis extending in the direction of said pivot axis, and means for torquing said mass about said pivot axis in response to both the output of said pickoff and the output of said gyroscope.

12. In combination, an accelerometer having a sensitive axis and comprising a support adapted to be fixedly mounted to a vehicle, a mass pivoted to said support about a pivot axis normal to said sensitive axis, a pickoff mounted between said mass and support, and having an output indicative of the angular relation therebetween, a motor mounted to torque said mass about said pivot axis, a gyroscope fixedly connected with said support and having an output indicative of the angular displacement of said support about an axis extending in the direction of said pivot axis, and a mixer having first and second inputs respectively coupled with said pickoff and gyroscope outputs, said mixer having an output coupled with said motor whereby said mass is torqued in accordance with the angular relation between said mass and support and in accordance with said angular displacement of said support.

References Cited

UNITED STATES PATENTS

| | | | |
|---|---|---|---|
| 2,802,956 | 8/1957 | Jarosh et al. | 264—1 |
| 2,770,452 | 11/1956 | Miller | 264—1 |
| 2,598,672 | 6/1952 | Braddon et al. | |
| 2,752,792 | 7/1956 | Draper et al. | |
| 2,553,560 | 5/1951 | Esval. | |

BENJAMIN A. BORCHELT, *Primary Examiner.*

SAMUEL BOYD, SAMUEL FEINBERG, ARTHUR M. HORTON, *Examiners.*

W. J. CURRAN, D. H. WARD, R. F. STAHL,
*Assistant Examiners.*